United States Patent
Wilson

(10) Patent No.: US 11,001,177 B2
(45) Date of Patent: May 11, 2021

(54) SEAT HEAT AND VENTILATION SYSTEMS AND VEHICLE SEAT ASSEMBLIES

(71) Applicant: B/E Aerospace, Inc., Winston-Salem, NC (US)

(72) Inventor: Christopher Wilson, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/736,413

(22) Filed: Jan. 7, 2020

(65) Prior Publication Data

US 2021/0039530 A1    Feb. 11, 2021

Related U.S. Application Data

(63) Continuation-in-part of application No. 16/534,309, filed on Aug. 7, 2019.

(51) Int. Cl.
*B60N 2/56*    (2006.01)

(52) U.S. Cl.
CPC ......... *B60N 2/5657* (2013.01); *B60N 2/5685* (2013.01)

(58) Field of Classification Search
CPC ............................ B60N 2/5657; B60N 2/5685
USPC .................................................... 297/180.12
See application file for complete search history.

(56) References Cited

U.S. PATENT DOCUMENTS

| | | | |
|---|---|---|---|
| 4,031,579 A | 6/1977 | Larned | |
| 6,869,140 B2 | 3/2005 | White et al. | |
| 8,672,411 B2 | 3/2014 | Gomes et al. | |
| 10,500,994 B1 * | 12/2019 | Dry | B60N 2/5657 |
| 2004/0160092 A1 | 8/2004 | Laib | |
| 2013/0084790 A1 * | 4/2013 | Furuse | 454/75 |
| 2013/0127210 A1 * | 5/2013 | Jung | B60N 2/5657 |
| | | | 297/180.12 X |

FOREIGN PATENT DOCUMENTS

DE    102007055034 A1 *    5/2009    ........... B60N 2/5642

* cited by examiner

*Primary Examiner* — Anthony D Barfield
(74) *Attorney, Agent, or Firm* — Suiter Swantz pc llo

(57) ABSTRACT

A conditioning system for a vehicle passenger seat and a vehicle passenger seat assembly, the system including at least one conditioning unit including a Venturi device configured to generate air flow relative to a seat element and a temperature element configured to heat or cool the Venturi device or the air flow, a temperature sensor configured to sense a temperature in relation to the at least one conditioning unit, and a controller communicatively coupled to the temperature sensor and operably coupled to the at least one conditioning unit. The controller is configured to operate in a first operating condition in which the Venturi device is activated and the temperature element is inactive to ventilate the seat, and a second operating condition in which both the Venturi device and the temperature element are activated to heat or cool the seat.

18 Claims, 5 Drawing Sheets

SEAT HEAT AND VENTILATION SYSTEMS AND VEHICLE SEAT ASSEMBLIES

This application is a Continuation in Part of U.S. application Ser. No. 16/534,309 filed on Aug. 7, 2019.

BACKGROUND

Vehicle passenger seats are designed to maximize safety and comfort. Seat comfort can be provided using soft materials such as cushions and dress covers positioned over rigid frame elements. Over time, seats that suffer from a constant sitting position and heat build-up can become uncomfortable. Discomfort can be alleviated by incorporating adjustable elements into the seat such as an adjustable backrest. In aircraft, for example, passenger seats can recline to achieve a more comfortable in-flight sitting position. While seats in premium seating classes can be configured to maximize seat adjustability, space and cost constraints in economy seating classes limit seats to fixed sitting positions or minimal backrest recline. A fixed or substantially fixed seat can cause pressure points and hot spots to form quickly and remain throughout the duration of a flight.

Seat discomfort can also be alleviated by heating or cooling the seat. Conventional seat heating systems typically utilize an electrical element which radiates heat to raise the surface temperature of a seat cushion. Conventional seat cooling systems typically utilize an air duct to flow cooled air through the seat. Because heating requires an electrical connection to the vehicle electrical system and cooling requires a fluid connection to the vehicle air conditioning system, separate systems are needed to heat or cool a seat. In large passenger vehicles such as aircraft, the greater the number of seats to be heated or cooled the greater the number of connections needed and consequential complexity of the system and drain on the existing vehicle systems. In aircraft, because of the large number of seats and limited capacity of the vehicle systems, only a limited number of seats can be conditioned, if any, which are typically reserved for premium seating classes.

Accordingly, what is needed is a system for ventilating, with or without heat, all types of vehicle passenger seats using a single system and in an efficient manner without overburdening existing vehicle systems.

BRIEF SUMMARY OF THE INVENTION

To achieve the foregoing and other aspects, in a first embodiment the present invention provides a conditioning system for a vehicle passenger seat including at least one conditioning unit including a Venturi device configured to generate air flow relative to a seat element and a heating element configured to heat the Venturi device or the air flow, a temperature sensor configured to sense a temperature in relation to the at least one conditioning unit, and a controller communicatively coupled to the temperature sensor and operably coupled to the at least one conditioning unit. The controller is configured to operate in a first operating condition in which the Venturi device is activated and the heating element is inactive, and a second operating condition in which both the Venturi device and the heating element are activated.

In some embodiments, the first operating condition may correspond to a seat ventilation condition in which a seat element is ventilated using generated air flow at ambient temperature, and the second operating condition may correspond to a seat heating condition in which a seat element is heated using generated air flow at a temperature greater than ambient air temperature.

In some embodiments, the temperature sensor may be configured to sense a temperature of at least one of the Venturi device, the air flow generated by the Venturi device, and a temperature in relation to a seat element.

In some embodiments, the controller may be operable for activating the Venturi device and the heating element on demand, such as by a command from a user control panel, or automatically responsive to a signal from the temperature sensor.

In some embodiments, the Venturi device may include a main body having a compressed air inlet configured to be coupled in fluid communication to a compressed air source, an ambient aft inlet in fluid communication with an ambient air supply, and an air outlet for directing the generated air flow from the Venturi device.

In some embodiments, the compressed air inlet may be positioned at one end of the main body and the ambient air inlet and the air outlet may be positioned near an opposing end of the main body and on opposing sides of the main body.

In some embodiments, the heating element may be formed as a sheet positioned in direct physical contact against the main body or as a resistive heating element positioned within or near an interior air flow passage through the main body.

In some embodiments, the heating element may be a resistive heating element disposed in the air outlet.

In some embodiments, the controller may operate to receive temperature information from the temperature sensor and supply electrical current to the heating element to heat the Venturi device to a predetermined temperature to produce a predetermined air temperature in outflow from the Venturi device.

In some embodiments, the controller may be operably coupled to a compressed air source coupled in fluid communication to a compressed air inlet of the Venturi device, the controller configured to activate the compressed air source to initiate a flow of air from the compressed air source to the Venturi device.

In some embodiments, controller activation of the compressed air source and the heating element may be synchronized or mutually exclusive.

In another embodiment the present invention provides a vehicle passenger seat including at least one seat element, at least one conditioning unit positioned relative to the at least one seat element, the at least one conditioning unit including a Venturi device configured to generate an air flow relative to the at least one seat element and a heating element configured to heat the Venturi device or the air flow, a temperature sensor configured to sense a temperature in relation to the at least one conditioning unit or the at least one seat element, and a controller communicatively coupled to the temperature sensor and operably coupled to the at least one conditioning unit. The controller is operable for operating the at least one conditioning unit in a first operating condition in which the Venturi device is activated and the heating element is inactive, and a second operating condition in which both the Venturi device and the heating element are activated.

In some embodiments, the first operating condition may correspond to a seat ventilation condition in which the at least one seat element is ventilated using the generated air flow at ambient temperature, and the second operating condition may correspond to a seat heating condition in which the at least one seat element is heated using the generated air flow at a temperature greater than ambient air temperature.

In some embodiments, the temperature sensor may be configured to sense a temperature of at least one of the Venturi device, the air flow generated by the Venturi device, and a temperature in relation to the at least one seat element.

In some embodiments, the controller may be operable, for activating the Venturi device and the heating element on demand or responsive to a signal from the temperature sensor.

In some embodiments, the Venturi device may include a main body having a compressed air inlet configured to be coupled in fluid communication to a compressed air source, an ambient air inlet in fluid communication with an ambient air supply, and an air outlet for directing the generated air flow from the Venturi device, and the compressed air inlet may be positioned at one end of the main body and the ambient air inlet and the air outlet may be positioned near an opposing end of the main body and on opposing sides of the main body.

In some embodiments, the heating element may be formed as a sheet positioned in direct physical contact against the main body to heat the main body directly or as a resistive heating element positioned within or near an interior air flow passage through the main body to heat the generated air flow directly.

In some embodiments, the at least one seat element may include a at least one of a backrest and a seat bottom, and a plurality of conditioning units may be positioned relative to each of the backrest and the seat bottom.

In some embodiments, the controller may be operably coupled to a compressed air source coupled in fluid communication to a compressed air inlet of the Venturi device, and the controller may be configured to activate the compressed air source to initiate a flow of air from the compressed air source to the Venturi device, and wherein controller activation of the compressed air source and the heating element may be synchronized or mutually exclusive.

In another embodiment, the present invention provides a conditioning system for a vehicle passenger seat including at least one conditioning unit including a Venturi device configured to generate air flow relative to a seat element and a temperature element configured to control a temperature of the Venturi device or the air flow, a temperature sensor configured to sense a temperature in relation to the at least one conditioning unit, and a controller communicatively coupled to the temperature sensor and operably coupled to the at least one conditioning unit, wherein the controller is operable for operating the at least one conditioning unit in a first operating condition in which the Venturi device is activated and the temperature element is inactive, and a second operating condition in which both the Venturi device and the temperature element are activated.

In some embodiments, the first operating condition may correspond to seat ventilation in which a seat element is ventilated using generated air flow at ambient temperature, and the second operating condition may correspond to seat conditioning in which a seat element is heated using generated air flow at a temperature above ambient air temperature or cooled using generated air flow at a temperature below ambient air temperature. Heating may be achieved by increasing the temperature of the Venturi device or air flow through the Venturi device. Cooling may be achieved by decreasing the temperature of the Venturi device or air flow through the Venturi device.

Embodiments of the invention may include one or more or any combination of the above aspects, features and configurations.

BRIEF DESCRIPTION OF THE DRAWINGS

Implementations of the embodiments disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
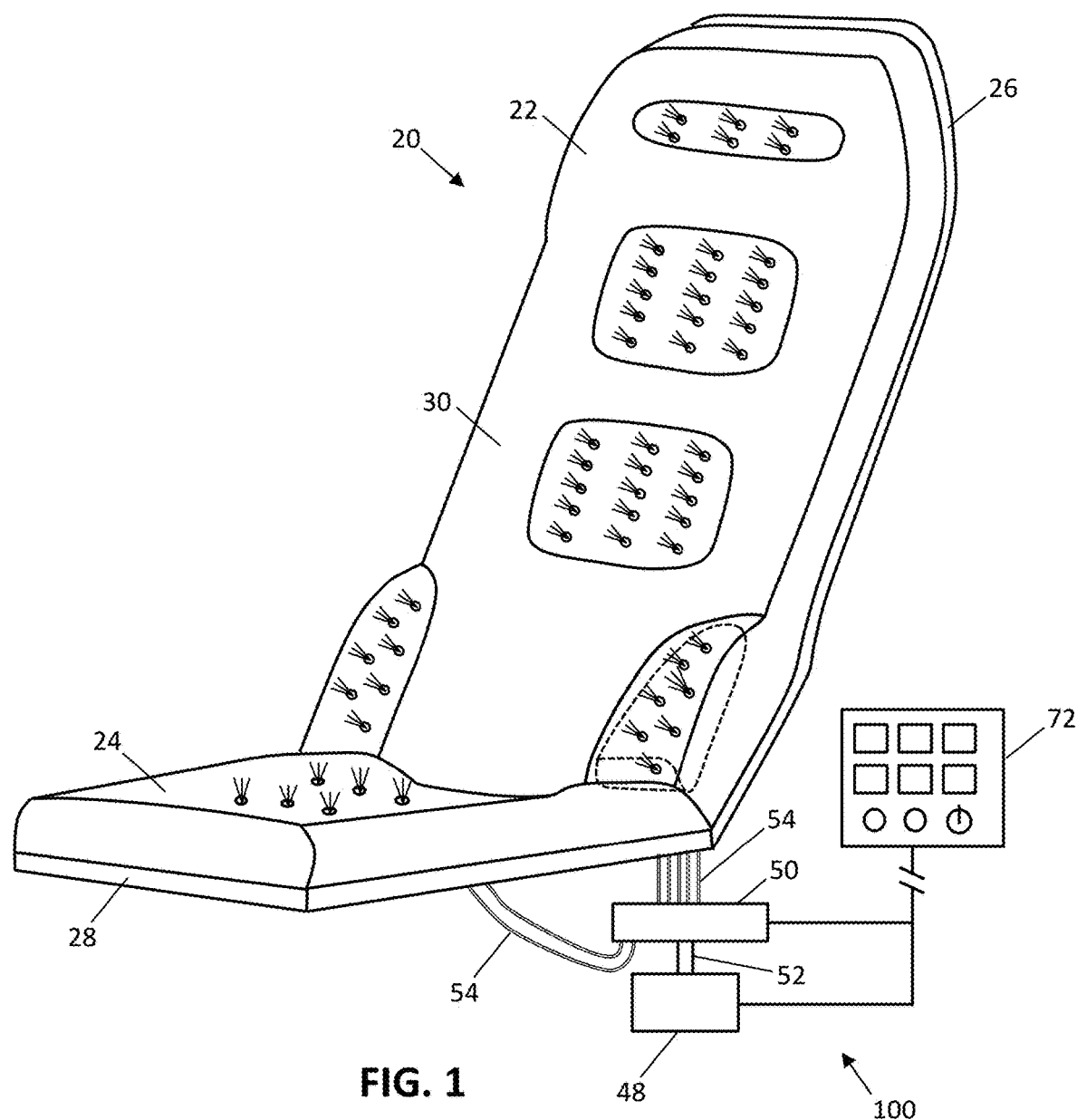
FIG. 1 is a system view showing schematically a vehicle passenger seat equipped with a temperature conditioning and ventilation system according to an embodiment of the invention.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

The exemplary embodiments disclosed herein are directed to seat conditioning (e.g., heating or cooling) and ventilation systems compatible for use with any type of seat construction such as vehicle passenger and crew seat constructions. The vehicle seats disclosed herein are non-limiting examples of seats for use in vehicles such as aircraft, motor vehicles, buses, trains, boats, and any other vehicle type having a seat or seats benefitting from a seat conditioning and ventilation system. Seats include both premium and economy class seat types. Seats may include seat elements such as a backrest and seat bottom, and optionally may include seat elements such as armrests, a leg rest, and a headrest. Seat elements may further include separate or detached elements for use with the seat such as an ottoman, footrest, console, etc. The systems disclosed herein can also be incorporated into monuments such as furniture separate from or associated with a seat. The systems disclosed herein are compatible with both fixed and adjustable seats, such as seats adjustable between upright and reclined sitting positions. Seats can include rigid frame members providing structural support, cushion elements positioned over rigid elements providing comfort and flotation, and dress covers positioned over the cushion elements providing comfort, durability and aesthetics. In other examples, composite and soft elements may be integrally formed and soft elements may achieve cushion and durability performance with a single element. The systems disclosed herein can be integrated into a seat construction regardless of adjustment and other capabilities of the seat.

The seat conditioning and ventilation systems generally operate as a single system to supply pressurized air to a Venturi device, or devices, positioned in relation to a seat element. Each Venturi device is configured to increase the efficiency of the compressed air system thereby allowing the system to yield more flow across the passenger as compared to a compressed air system of the same power output that does not utilize a Venturi effect, or a ventilated seat system operating with fans (e.g., non-compressed air systems). Such Venturi systems are superior in that a high volumetric flow rate can be achieved with a small input of volumetric flow rate, therefore increasing the efficiency as compared to an equivalent system of either purely compressed air ventilation or non-compressed. The systems disclosed herein can ventilate a seat, with or without heated or cooled air. The systems disclosed herein can achieve a significantly higher outlet pressure as compared to a fan, as well as avoid stalling out when the flow path is blocked by a seated passenger.

Figure 2:
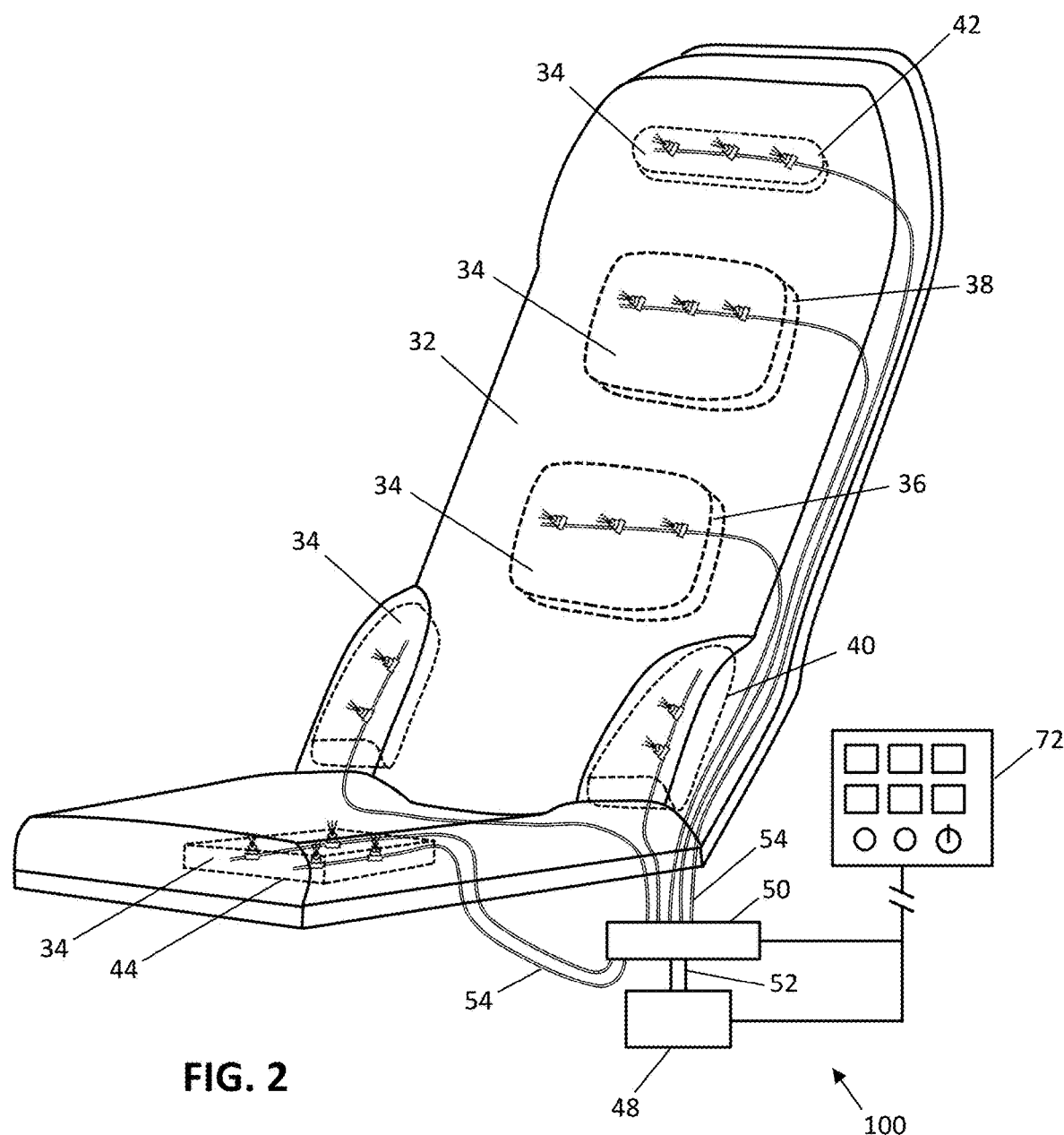
FIG. 2 is a system view showing predetermined zones of the backrest and seat bottom to be ventilated or temperature adjusted using the system according to an embodiment of the invention.

Referring to FIGS. 1 and 2, a non-limiting example of a vehicle passenger seat assembly compatible for use with the embodiments of seat conditioning and ventilation systems disclosed herein is shown at reference numeral 20. The seat assembly 20 generally includes a backrest assembly 22 and a seat bottom assembly 24, each which may include soft materials such as cushion elements. A backrest structural element 26 supports the backrest assembly 22. A seat pan 28 supports the seat bottom assembly 24. Each of the backrest structural element 26 and the seat pan 28 may be constructed from rigid materials such as composites or metal to support their respective assembly. Each of the backrest assembly 22 and the seat bottom assembly 26 can be covered with a dress cover 30 for comfort, performance and aesthetics. As discussed below, portions of the dress cover corresponding to zones can be perforated for allow airflow therethrough.

The construction and configuration of the backrest structural element 26 and the seat pan 28 is not limiting and may vary. For example, the two components may be continuous across the respective back and bottom of the seat or may be skeletal elements supporting a diaphragm. The two components may be pivotally coupled such that the angle therebetween can be changed, for example, can increase as the seat reclines and decrease and the seat moves toward upright. The components may be pivotally connected or coupled to other frame elements such as seat spreaders. The angle of the backrest may be adjusted and locked relative to the seat bottom. For example, in an economy class seat construction a gas compression spring may act between the backrest and the frame and a button may be positioned in the armrest actuated to unlock the gas spring through a lever and Bowden cable arrangement, among other arrangements. In a premium class seat construction, for example, a control panel may be electrically coupled to one or more seat actuators dedicated for driving component adjustability either alone or between discrete sitting positions. The systems disclosed herein can operate mutually exclusive of any seat adjustment system.

Each of the backrest assembly 22 and the seat bottom assembly 24 may include more than one type of material in the cushion construction. In some embodiments, the cushion assemblies may include one or more layers of open-cell foam and closed-cell flotation foam with fire-resistant layers or additives, referred to herein collectively as the "foam" portion of the cushion assemblies shown generally at reference numeral 32. Cushion assemblies may additionally include spacer mesh 34 positioned in predetermined zones. Spacer mesh may be a three-dimensional mesh like body attached to or affixed within the foam to prevent the spacer mesh from being displaced with respect to the foam body. In some embodiments, the spacer mesh is positioned in zones to be ventilated, with or without heat, and the foam is positioned outside of those zones. While both the foam and spacer mesh provide comfort and passenger support, the open-cell structure of the spacer mesh allows comparatively more airflow therethrough. Some spacer mesh within the assembly may be positioned directly adjacent (e.g., beneath) a perforated portion of the dress cover. Other spacer mesh may be positioned internal to the cushion such as within an air column in which ambient air can be drawn in for adding/mixing with the pressurized air as described below.

Zones on the seat may correspond to points of likely passenger contact. For example, regarding the backrest assembly 22, zones may be provided in one or more of a lower backrest or lumbar area 36, upper backrest area 38, side bolster areas 40, and a headrest area 42. Regarding the seat bottom assembly 24, for example, a zone may correspond to a central region 44 of the seat bottom or other area. While the zones may correspond to areas of the cushion assembly likely to be in passenger contact in likely sitting positions, the zones may also be to one or more of the lateral sides and longitudinal ends in embodiments functioning to move air through the cushion assembly in general. Depending on the types of foam and spacer mesh, comfort differences between the two foam types may be imperceptible to the passenger, particularly when positioned beneath a seat dress cover. Each of the foam and the spacer mesh may be formed with contouring and concave portions to conform to passenger anatomy.

Portions of the spacer mesh adjacent the foam may be sealed to prevent air leakage. In some embodiments, the faces of the spacer mesh facing away from the passenger may also be sealed such that air contained in the spacer mesh is directed out through the unsealed face toward the passenger. In embodiments in which the spacer mesh is positioned in an air column in fluid communication with an ambient air supply, the faces of the spacer mesh intended to draw ambient air in may be unsealed, while the faces in contact with the spacer foam or support element may be sealed to direct air flow through the spacer mesh without leaking.

Figure 3:
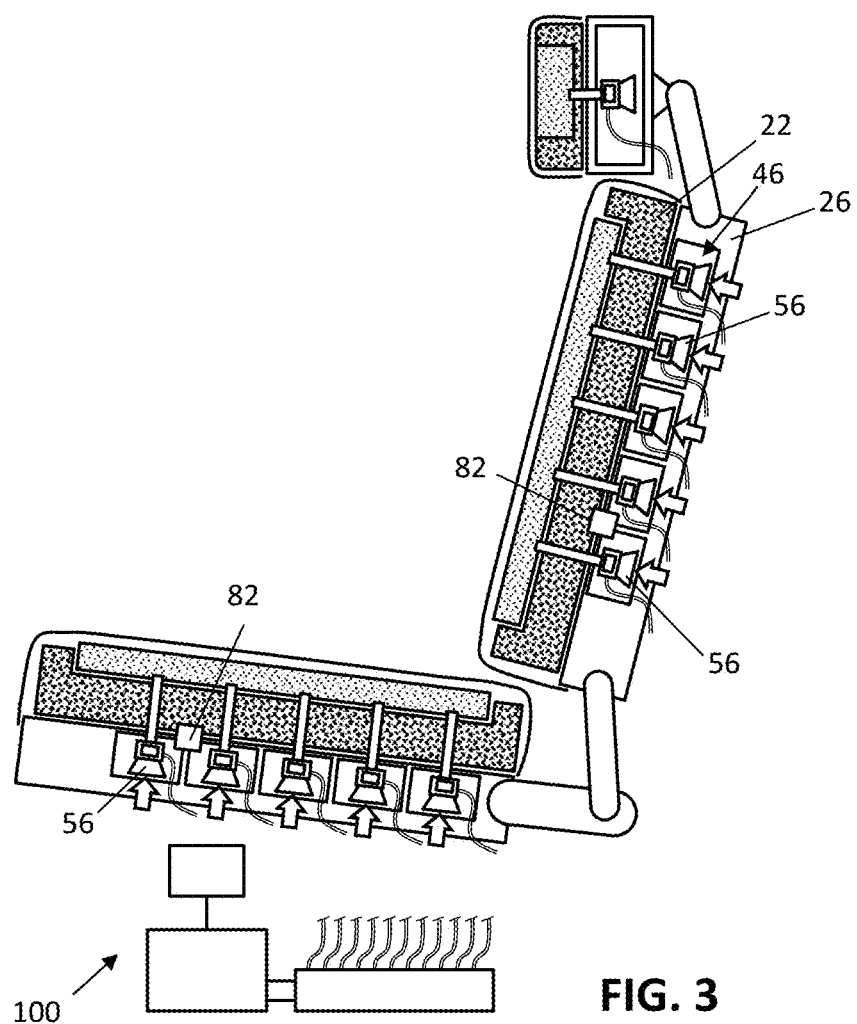
FIG. 3 is a cross-sectional view through the vehicle passenger seat showing Venturi device positioning for drawing in ambient air and a conditioning element coupled to each Venturi device.

Referring to FIG. 3, the backrest cushion assembly 22 may be spaced apart from its respective backrest support element 26 such that an air column 46 is formed between a back of the cushion assembly and a front of the support element. The air column, which may be filled with spacer mesh, is in fluid communication with ambient air from above or below the air column in the case of the backrest such that ambient air is drawn from outside the seat assembly in through the air column. Ambient air at ambient temperature may be drawn from behind the backrest structural element from the area immediately behind the seat, depending on the position of the Venturi devices 56. In the case of the seat bottom, ambient air at ambient temperature may be drawn from an air column formed between the seat bottom cushion assembly and the seat pan or from below the seat pan, among other locations. Drawing ambient air from outside the seat assembly as opposed to drawing trapped air from within the seat assembly provides a lower ambient air temperature.

Referring again to FIG. 1, the seat assembly 20 includes a seat conditioning and ventilation system 100 incorporated into at least one of the backrest assembly 22 and the seat bottom assembly 24. As shown, the system 100 is incorporated into both assemblies. It is intended and understood that the seat assembly may include a ventilation system for ventilating one or more of the backrest and seat bottom, with additional systems optionally incorporated into the leg rest and arm rests where applicable. As shown in FIG. 2, the multiple systems may be coupled and supplied by a single air compressor 48 for supplying compressed air to a manifold assembly 50 coupled in fluid communication to the air compressor via an air conduit 52. As discussed below, the manifold assembly 50 may be actuated to supply a flow of compressed air to one or more of the conduit networks 54 in the seat assembly depending on the zone to be ventilated.

The air compressor 48 may be located near the seat assembly, such as below the seat pan 28 or backrest structural element 26. The manifold assembly 50 may be attached directly to the air compressor 48 or may be removed therefrom and coupled in fluid communication to an air conduit 52, such as an air hose or the like, so that the manifold assembly and the air compressor can be located in two different locations with respect to the seat assembly due to packaging and space constraints. An electric motor of the air compressor 48 may be electrically activated to generate a supply of pressurized air. The air compressor 48 may operate at a fixed predetermined pressure such as a low inlet pressure yielding a flow large enough to cool the passenger, for example, less than 1 psi gauge pressure at the inlet of the Venturi devices, or in a range from 1-5 psi, or greater than 5 psi. The air compressor 48 may further include a pressure regulator and pressure gauges to control the amount of pressure provided to the manifold assembly 50. The air compressor may or may not include a small volume air storage tank providing a reservoir for storing air under pressure for immediate seat ventilation performance on demand. In a system including an air storage tank, the air compressor may regularly cycle on and off to replenish the supply of air in the tank when the tank reaches a predetermined low-pressure point. In a system without an air storage tank, the air compressor may activate with a control command to supply air and deactivate with a control command to discontinue supplying air.

The manifold assembly 50 may include a safety pressure release valve for releasing pressure from within manifold assembly. The manifold assembly 50 generally operates to control and distribute compressed air generated by the air compressor 48 to the conduit network(s) 54. The manifold assembly 50 generally includes an air inlet coupled in fluid communication to an air outlet of the air compressor via an air conduit 52, such as a length of tubing, and one or more outlet ports corresponding in number to the number of air conduits of the conduit network. For example, the outlet ports may include 1, 2, 3 . . . n number of outlet ports corresponding to 1, 2, 3, . . . n number of air conduits of the conduit network. Extra outlet ports may be included to allow for future expansion of the system. Quick connect fittings, threaded connections, and the like may be used to attach the air conduits to the manifold assembly 50. A pressure regulator assembly may be incorporated into the manifold assembly 50 and includes one or more valves opened or closed by actuating the controller to regulate the pressure of the compressed air at the one or more outlet ports to control air flow. For example, it may be desirable to provide the same or different air flow through the backrest and seat bottom. It may also be necessary to provide more air flow to a grouping of the conduit network having a greater number of Venturi devices. The conduit networks may be configured regarding pressure drops across the networks such that their individual restriction yield equal flow to each Venturi device. For example, in a network including two Venturi devices supplied by the same air source, with one circuit having a longer length of tubing or more bends than the other circuit, the system may be adjusted such that the two inlets receive the same air flow. Adjustment can be achieved, for example, utilizing flow control valves or a flow divider device (e.g., mechanical coupling of turbine shafts such that the volumetric flow rate through is equivalent). In another example, flow equivalence can be achieved by controlling pressure drops through the air conduits and fittings.

The conduit network 54 generally includes one or more lengths of air conduit, such as tubing, each extending between an outlet port of the manifold assembly 50 and a compressed air inlet of one of the Venturi devices. Each length of air conduit may be a direct run from one air outlet to one compressed air inlet. In some embodiments, a single outlet of the manifold assembly may supply a flow of compressed air to a single air conduit that in turn is split to supply compressed air to more than one downstream air conduit feeding a plurality of Venturi devices. The air conduits may be routed through the respective seat elements, between a seat element and its respective supporting element, or within passages defined along a face of the supporting element.

Each Venturi device is coupled in fluid communication to a length of air conduit of the conduit network. For example, Venturi devices positioned in the backrest may be coupled to a first conduit network in the backrest coupled in fluid communication to the manifold assembly, and the Venturi devices positioned in the seat bottom may be coupled to a second conduit network in the seat bottom coupled in fluid communication to the manifold assembly. Each Venturi device may be positioned relative to at least one seat element, such as a cushion assembly, to direct a flow of air out through a face of the cushion in one of the predetermined zones. The Venturi devices may be embedded in a cushion assembly, positioned between separate cushion assemblies, coupled to the cushion supporting element, etc., depending on the configuration of the Venturi devices and where ambient air is intended to be drawn from. In an alternative embodiment, the Venturi devices may be positioned relative to their respective seat element to pull air across the passenger by directing air flow back into the seat instead of out a face of the cushion.

Figure 4:
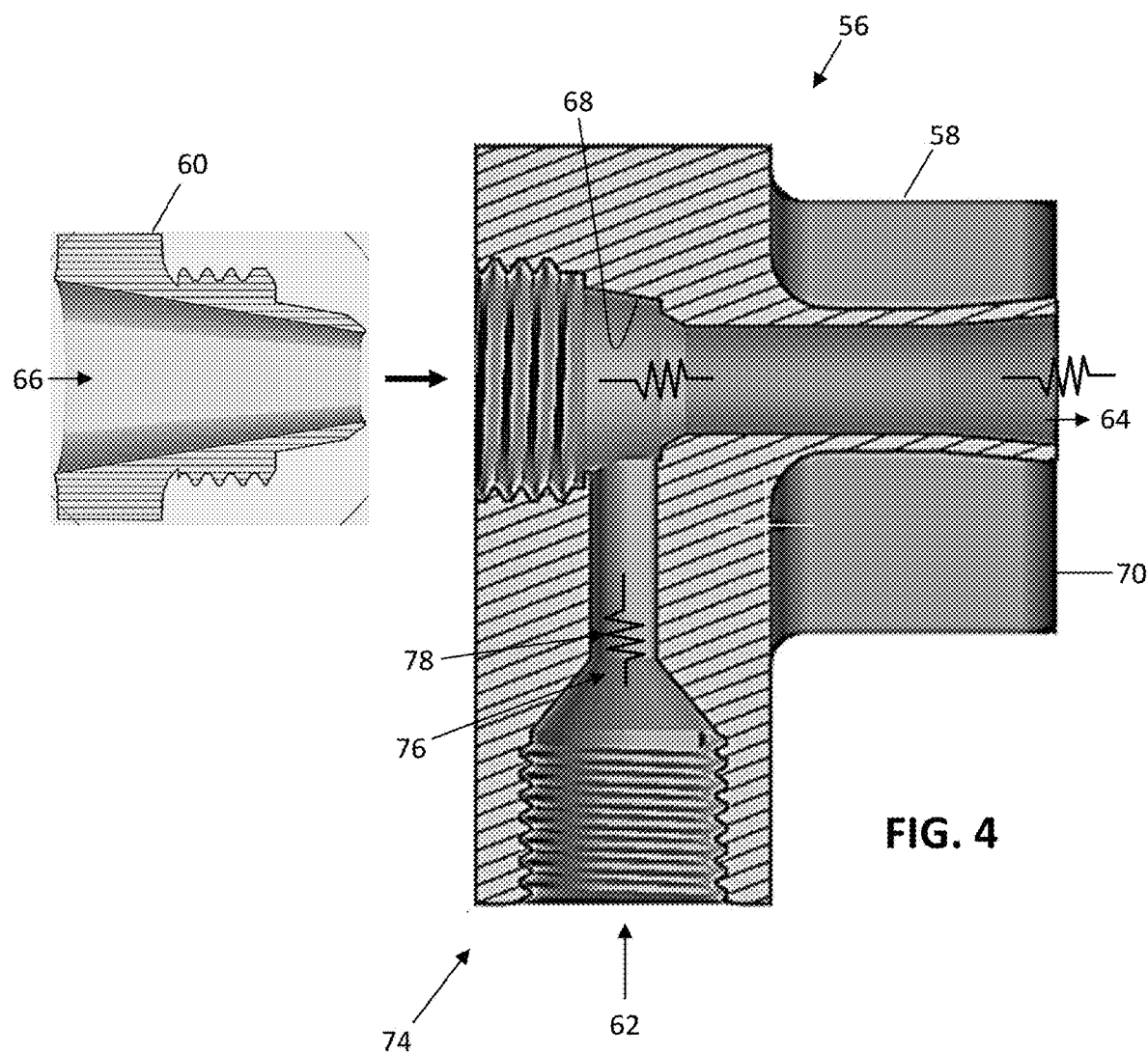
FIG. 4 is an exploded cross-sectional view of a Venturi device including a resistive heating element positioned in an airflow pathway through the device.
Figure 5:
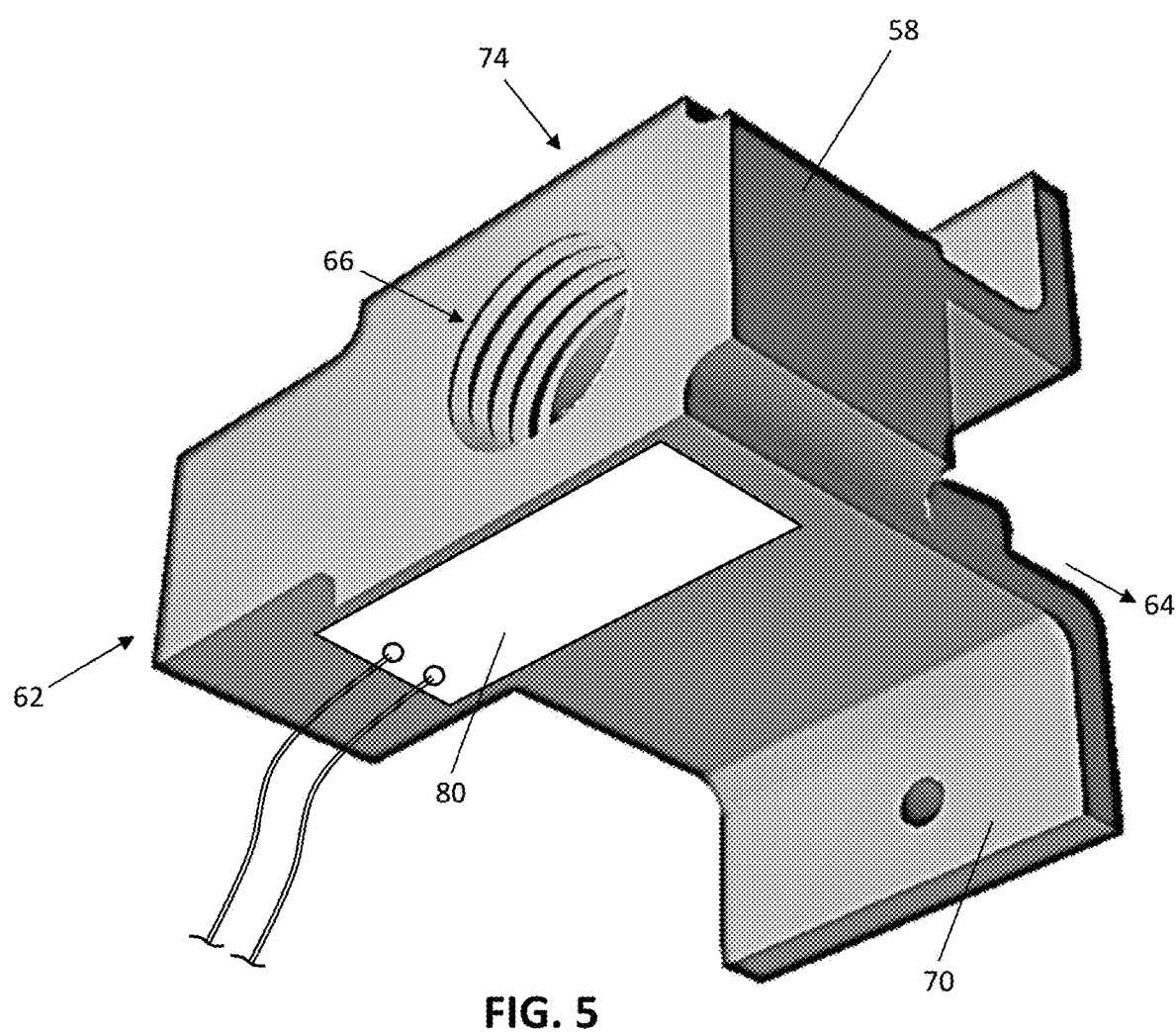
FIG. 5 is a perspective view of a Venturi device including a heating element formed as a sheet affixed to the main body.

Referring to FIGS. 4 and 5, a non-limiting example of Venturi device is shown at reference numeral 56. Each Venturi device 56 generally operates to receive a small volume of pressurized air to induce a larger flow of ambient air. In other words, each Venturi device generally operates to receive a small volumetric flowrate of pressurized air to induce a vacuum that causes ambient air to be drawn into the device, thereby yielding a larger volumetric flowrate of combined airflow out of the device. As compared to passive systems utilizing a large pump to move air, the present system utilizes a small pump to produce a higher pressure and higher volumetric flow rate.

In a non-limiting example, the Venturi device 56 can include a main body 58 and a secondary body 60. The main body 58 forms the compressed air inlet 62 and the mixed air outlet 64 and is configured to couple the secondary body 60 forming the ambient air inlet 66. The compressed air inlet 62 is internally threaded to receive an externally threaded coupling of an air conduit in threaded engagement. The portion of the main body 58 receiving the secondary body 60 is also internally threaded to receive the externally threaded secondary body 60 in threaded engagement. The secondary body 60 has an axial air flow passage therethrough having an annular taper forming a cone facing a direction of the mixed air outlet 64, such that when the secondary body 60 is threadably engaged in the main body 58 an annular space 68 is formed between the outside of the secondary body 60 and the inside of the main body 58. The installation of the secondary body 60 in the main body reduces the flow opening of compressed air through the main body 58, thereby creating a choke point and an annular curtain of compressed air flow to flow in a direction of the mixed air outlet 64, causing a suction effect. The suction effect causes ambient air to be drawn in through the ambient air inlet 66 and the two air flows (i.e., compressed air flow and ambient air flow) are added to cause a larger flow of air at ambient air pressure to flow out through the mixed air outlet 64. As shown, the compressed air inlet 62 may be positioned at one end of the main body 58, while the ambient air inlet 66 and mixed air outlet 64 may be positioned at the opposing end of the main body and on opposing sides of the main body.

Each mixed air outlet 64 may be directed toward a predetermined zone, such as a cushion assembly or elsewhere. For example, mixed air outlets may be positioned inward of the forwardmost face of the backrest cushion assembly or the top face of the seat bottom cushion assembly to direct a flow of air through the front of the cushion and across a passenger. In another configuration, the mixed air outlets may be positioned to direct a flow of air through a spacer mesh at the front of the cushion assembly to circulate air through the cushion assembly and ultimately out the front of the cushion. The ambient air inlets are positioned to draw ambient air from within the seat assembly or outside of the seat assembly, and the main body 58 may include an integrated bracket 70 for securing the Venturi device in place on a seat element.

In some embodiments, the plurality of Venturi devices may be provided as a first grouping of devices positioned to deliver a flow of air to or through a first zone and a second grouping of devices to deliver a flow of air to or through a second zone of the same or different seat element. For example, when the cushion assembly is part of a backrest, the first zone may correspond to one of a lower backrest area, an upper backrest area, a lumbar area, a side bolster area, and a headrest area, and a second zone may correspond to another one of those same areas. The system can include any number of zones and corresponding number of air conduits providing a flow of compressed air to the same. Each zone can include one or more devices depending on the size of the zone and desired heating or ventilation effect. In a backrest example, the structural element may be a continuous backrest element positioned behind a backrest cushion assembly in spaced apart relation thereto such that an air column is formed between the backrest cushion assembly and the structural element, the aft column in fluid communication with ambient air above or below the air column outside of the seat assembly, and wherein the ambient air inlet of each of the plurality of Venturi devices is positioned to draw air from the air column.

Each Venturi device 56 is a component of a conditioning unit 74, with each conditioning unit including the Venturi device configured to generate air flow relative to a seat element and a temperature element 76 configured to adjust the temperature of the Venturi device or airflow through the device. For example, to raise the seat temperature, the temperature element 76 may be a heating element formed and positioned depending on the body or air mass to be heated. For example, FIG. 4 shows a first embodiment of a conditioning unit 74 in which the temperature element 76 is a heating element provided as a resistive heating element 78 disposed in an airflow passageway within the device. In non-limiting examples, the resistive heating element 78 may be positioned near the compressed air inlet 62 to heat the incoming pressurized air, near the ambient air inlet to heat the ambient air being drawn in, or near the air outlet to heat the mixed air being directed out of the device. FIG. 5, for example, shows the temperature element 76 formed as a sheet 80 positioned in direct physical contact against the main body 58 to raise the temperature of the main body to heat the air flowing therethrough. In another example, the conditioning element 76 may be a cooling element for cooling the Venturi device. In a non-limiting example, the cooling element may be a Peltier cooling device or the nozzle itself made to be a Peltier device. The cooling element can be used to cool the body of the Venturi device or device airflow.

Referring again to FIG. 3, the system 100 further includes a temperature sensor 82 configured to sense a temperature in relation to the at least one conditioning unit 74. The temperature sensor 82 may be configured and positioned to detect the temperature of the Venturi device 56 such as the temperature of the main body 58, the air temperature within or exiting the device, or the air temperature in the vicinity of the device, or devices, such as the air temperature within a seat element conditioned by the device or devices. The temperature sensor 82 is communicatively coupled to a controller 72, which is operably coupled to each conditioning unit 74 or group or groups of conditioning units.

The controller 72 operates to receive signals from the temperature sensor 82, or sensors, and responsive to those signals electrically activate or deactivate the temperature element 76 of each conditioning unit 74. The temperature element, such as a heating or cooling element, can be activated through the controller 72 on demand such as by a user controlling the seat conditioning feature. The controller 72 may also automatically electrically activate or deactivate the temperature elements 76 by supplying current or discontinuing current to the elements. Control may be based on predetermined temperatures or temperature ranges, exceeding upper and lower threshold temperatures, approaching upper and lower threshold temperatures, maximum temperatures, time-based programming, or any other temperature or safety, protocol. The controller 72 may also be operably coupled to the air compressor 48, turning the compressor on and off and adjusting air pressure based on some of the same protocols but regarding pressure as opposed to temperature.

In a non-limiting example, the controller 72 may be operable for operating the system in at least to different operating modes. In some embodiments, the controller 72 may be operable for operating the at least one conditioning unit 74 in a first operating condition in which the Venturi device 56 or devices is/are activated and the conditioning element 76 of each is inactive, and a second operating condition in which both the Venturi device 56 or devices and the conditioning elements are activated. The first operating condition may correspond to a seat ventilation condition in which a seat element is ventilated using generated air flow at ambient temperature, and the second operating condition may correspond to a seat conditioning in which a seat element is heated or cooled using generated air flow at a temperature above or below ambient air temperature. Other operating conditions are possible such as heating or cooling each individual zone while ventilating others.

In use, the controller 72 in part operates to receive temperature information from the temperature sensor 82 and supply electrical current to the conditioning element 76 to adjust the temperature of the Venturi device 56 to a predetermined temperature to produce a predetermined air temperature in outflow from the Venturi device, and the controller is operably coupled to the compressed air source 48 coupled in fluid communication to the compressed air inlet of the Venturi device or devices, and the controller 72 configured to activate the compressed air source to initiate a flow of air from the compressed air source to the Venturi device. Controller activation of the compressed air source and the conditioning element can be synchronized or mutually exclusive. For example, it may be desired to first activate the temperature element 76, which for example is a heating element, to raise the temperature of the main body 58 to a predetermined temperature before activating the air compressor 48 to initiate flow to the Venturi device 56 or devices. Such a protocol delays air flow until the device or devices are brought up to temperature, minimizing airflow at ambient temperature from the system.

The controller 72 may be further operable for activating the air compressor 48 to supply compressed air and actuating the manifold assembly 50 to cause compressed air to flow through the conduit network(s). The controller 72 may be operatively coupled to or an integral part of a passenger seat control interface. The control interface may be located on the seat assembly or in proximity thereto. The control interface may be collocated with the seat control features such that all seat comfort controls are provided in the same passenger device. Ventilation system controls may include, but are not limited to, one or more of activating the air compressor, adjusting compressor output, selecting zones, hat and temperature adjustments, etc. Each passenger control interface may be networked with a master crew controller capable of overriding each individual seat controller. For example, all seat heat and ventilation systems may be deactivated during taxi, takeoff and landing and permitted to be selectively activated during flight.

In some embodiments, the controller 72 communicates with the temperature sensor 82 or sensors to activate the conditioning unit 74 or units in response to a sensed condition, such as a predetermined threshold temperature in one of the zones to automatically and proactively avoid passenger discomfort. Each sensor may be a device or a subsystem capable of detecting condition changes within the seat assembly and with a processor within or in communication with the controller. The system sensors relay information to the processor where processing logic analyzes the data received to control the ventilation system. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide area network (WAN), a local area network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A conditioning system for a vehicle passenger seat, comprising:

at least one conditioning unit comprising a Venturi device configured to generate air flow relative to a seat element and a heating element configured to heat the Venturi device or the air flow;
a temperature sensor configured to sense a temperature in relation to the at least one conditioning unit; and
a controller communicatively coupled to the temperature sensor and operably coupled to the at least one conditioning unit;
wherein the controller is operable for operating the at least one conditioning unit in a first operating condition in which the Venturi device is activated and the heating element is inactive, and a second operating condition in which both the Venturi device and the heating element are activated; and
wherein the Venturi device comprises a main body having a compressed air inlet configured to be coupled in fluid communication to a compressed air source, an ambient air inlet in fluid communication with an ambient air supply, and an air outlet for directing the generated air flow from the Venturi device.

2. The conditioning system according to claim 1, wherein the first operating condition corresponds to a seat ventilation condition in which a seat element is ventilated using generated air flow at ambient temperature, and the second operating condition corresponds to a seat heating condition in which a seat element is heated using generated air flow at a temperature greater than ambient air temperature.

3. The conditioning system according to claim 1, wherein the temperature sensor is configured to sense a temperature of at least one of the Venturi device, the air flow generated by the Venturi device, and a temperature in relation to a seat element.

4. The conditioning system according to claim 1, wherein the controller is operable for activating the Venturi device and the heating element on demand or responsive to a signal from the temperature sensor.

5. The conditioning system according to claim 1, wherein the compressed air inlet is positioned at one end of the main body and the ambient air inlet and the air outlet are positioned near an opposing end of the main body and on opposing sides of the main body.

6. The conditioning system according to claim 1, wherein the heating element is formed as a sheet positioned in direct physical contact against the main body or as a resistive heating element positioned within or near an interior air flow passage through the main body.

7. The conditioning system according to claim 1, wherein the controller operates to receive temperature information from the temperature sensor and supply electrical current to the heating element to heat the Venturi device to a predetermined temperature to produce a predetermined air temperature in outflow from the Venturi device.

8. The conditioning system according to claim 1, wherein the controller is operably coupled to a compressed air source coupled in fluid communication to a compressed air inlet of the Venturi device, the controller configured to activate the compressed air source to initiate a flow of air from the compressed air source to the Venturi device, and wherein controller activation of the compressed air source and the heating element is synchronized or mutually exclusive.

9. A vehicle passenger seat, comprising:
at least one seat element;
at least one conditioning unit positioned relative to the at least one seat element, the at least one conditioning unit comprising a Venturi device configured to generate an air flow relative to the at least one seat element and a heating element configured to heat the Venturi device or the air flow;
a temperature sensor configured to sense a temperature in relation to the at least one conditioning unit or the at least one seat element; and
a controller communicatively coupled to the temperature sensor and operably coupled to the at least one conditioning unit;
wherein the controller is operable for operating the at least one conditioning unit in a first operating condition in which the Venturi device is activated and the heating element is inactive, and a second operating condition in which both the Venturi device and the heating element are activated; and
wherein the Venturi device comprises a main body having a compressed air inlet configured to be coupled in fluid communication to a compressed air source, an ambient air inlet in fluid communication with an ambient air supply, and an air outlet for directing the generated air flow from the Venturi device.

10. The vehicle passenger seat according to claim 9, wherein the first operating condition corresponds to a seat ventilation condition in which the at least one seat element is ventilated using the generated air flow at ambient temperature, and the second operating condition corresponds to a seat heating condition in which the at least one seat element is heated using the generated air flow at a temperature greater than ambient air temperature.

11. The vehicle passenger seat according to claim 9, wherein the temperature sensor is configured to sense a temperature of at least one of the Venturi device, the air flow generated by the Venturi device, and a temperature in relation to the at least one seat element.

12. The vehicle passenger seat according to claim 9, wherein the controller is operable for activating the Venturi device and the heating element on demand or responsive to a signal from the temperature sensor.

13. The vehicle passenger seat according to claim 9, wherein the compressed air inlet is positioned at one end of the main body and the ambient air inlet and the air outlet are positioned near an opposing end of the main body and on opposing sides of the main body.

14. The vehicle passenger seat according to claim 9, wherein the heating element is formed as a sheet positioned in direct physical contact against the main body to heat the main body directly or as a resistive heating element positioned within or near an interior air flow passage through the main body to heat the generated air flow directly.

15. The vehicle passenger seat according to claim 9, wherein the at least one seat element comprises at least one of a backrest and a seat bottom, and wherein a plurality of the conditioning units are positioned relative to at least one of the backrest and the seat bottom.

16. The vehicle passenger seat according to claim 9, wherein the controller is operably coupled to a compressed air source coupled in fluid communication to a compressed air inlet of the Venturi device, the controller configured to activate the compressed air source to initiate a flow of air from the compressed air source to the Venturi device, and wherein controller activation of the compressed air source and the heating element is synchronized or mutually exclusive.

17. A conditioning system for a vehicle passenger seat, comprising:
at least one conditioning unit comprising a Venturi device configured to generate air flow relative to a seat element and a temperature element configured to adjust a temperature of the Venturi device or the air flow;

a temperature sensor configured to sense a temperature in relation to the at least one conditioning unit; and a controller communicatively coupled to the temperature sensor and operably coupled to the at least one conditioning unit;

wherein the controller is operable for operating the at least one conditioning unit in a first operating condition in which the Venturi device is activated and the temperature element is inactive, and a second operating condition in which both the Venturi device and the temperature element are activated; and wherein the Venturi device comprises a main body having a compressed air inlet configured to be coupled in fluid communication to a compressed air source, an ambient air inlet in fluid communication with an ambient air supply, and an air outlet for directing the generated air flow from the Venturi device.

18. The conditioning system according to claim 17, wherein the first operating condition corresponds to seat ventilation in which a seat element is ventilated using generated air flow at ambient temperature, and the second operating condition corresponds to seat conditioning in which a seat element is heated using generated air flow at a temperature above ambient air temperature or cooled using generated air flow at a temperature below ambient air temperature.

* * * * *